United States Patent [19]

Petty et al.

[11] Patent Number: 4,855,066

[45] Date of Patent: Aug. 8, 1989

[54] HYDROCYCLONE

[75] Inventors: Charles A. Petty, Haslett; Hsin-Chih Chen, East Lansing, both of Mich.

[73] Assignee: Board of Trustees operating Michigan State University, East Lansing, Mich.

[21] Appl. No.: 189,157

[22] Filed: May 2, 1988

[51] Int. Cl.[4] .............................................. B01D 21/26
[52] U.S. Cl. .................................. 210/788; 210/512.2; 55/345; 55/459.1; 209/144; 209/211
[58] Field of Search .......... 210/512.1, 512.2, 787–789; 55/204, 345, 459.1; 209/144, 211

[56] References Cited

U.S. PATENT DOCUMENTS

| | | | |
|---|---|---|---|
| 3,971,718 | 7/1976 | Reid | 210/788 X |
| 4,297,111 | 10/1981 | Ross | 210/788 X |
| 4,696,737 | 9/1987 | Bouchillon | 210/788 X |

Primary Examiner—Charles Hart
Attorney, Agent, or Firm—Ian C. McLeod

[57] ABSTRACT

A hydrocyclonic apparatus has been designed to separate a less dense dispersed phase (either liquid or solid) from a more dense liquid phase. The cyclone separator consists of two generally cylindrical portions positioned around the longitudinal axis in a 'piggyback' manner. A vortex finder with an orifice plate captures the dispersed particles entrained in a local secondary flow established by the unique operating and design parameters of the device. Clear fluid is removed from the apparatus through an underflow tube opposite the vortex finder tube. The liquid feed containing dispersed particles is introduced into the primary cyclone around the vortex finder as a swirling annular jet. Another stream, containing no dispersed phase, is introduced as a tangential flow surrounding the annular jet. A polymer stream is injected into the core of the vortex flow of the primary cyclone to increase the stability of the vortex core and to moderate the turbulence.

16 Claims, 8 Drawing Sheets

HYDROCYCLONE

FIELD OF THE INVENTION

This invention relates to devices for separating a less dense dispersed phase from a more dense liquid phase by using the centrifugal action of swirling flows. Two novel flow effects are incorporated into the design: (1) the use of a central toroidal recirculation zone for large swirl numbers, and (2) the use of friction-reducing polymers to control the turbulence and the drop-size distribution.

The improved hydrocyclone could be used for de-oiling water on offshore platforms or for cleaning bilge water from oil tankers.

PRIOR ART

Thew and his co-workers at Southampton University (UK) have been developing improvements to the hydrocyclone for de-oiling water (Colman and Thew 1980, 1981; Nezhati and Thew 1987). The performance of a hydrocyclone as a liquid-liquid separator is directly affected by four factors: (1) large-scale secondary flows that remix the separated dispersion, (2) turbulent fluctuations that cause remixing and drop breakup, (3) an inverse relationship between the separation force and the time available for separation, and (4) particle equilibrium orbits within the core of the vortex. Many variations in the basic design of hydrocyclones have been introduced to compensate for one or more of these factors (Bednarski and Listewnik 1987; Thew 1987, Bradley 1965). Thew eliminated the large-scale secondary flows in the upper part of the hydrocyclone by using a larger than "normal' swirl chamber and a tangential feed with a lower kinetic energy. This also lowers the turbulent intensity at entry.

To compensate for the lower centrifugal force, the conical section of the Southampton design is much longer than conventional hydrocyclones used for other separation problems. However, the flow remains turbulent and large oil droplets can still be torn apart by turbulent fluctuations. Therefore, the modified design of Thew has unavoidable intrinsic limitations.

A small amount of polyethylene oxide in water (<100 wppm) has a significant effect on the properties of turbulent flows (Virk 1975; Sellin and Moses 1984). For small capillary tubes, an order of magnitude reduction in the friction factor for fully developed turbulent flow can occur; for larger pipes of industrial interest, the effect is smaller but still significant. Generally, any linear, flexible, macromolecule having a molecular weight larger than 500,000 is an effective drag reducer in dilute solutions. Although the specific physical mechanism underlying this phenomenon remains unclear, the practical consequences are clear: turbulence is moderated. Thus, trace amounts of polymer injected into the core region of a flooded (no air core) hydrocyclone can dampen turbulent fluctuations that cause liquid drops to break into smaller drops. Moreover, the polymer may also stabilize the central core flow (Dabir 1983).

Liquid-liquid separations in swirling flows may also be improved significantly by exploiting more directly certain flow patterns that develop within the core region of a vortex. For example, when the characteristic swirl number, defined by $$S = \frac{\left(\begin{array}{c}\text{AXIAL FLUX OF}\\ \text{SWIRL MOMENTUM}\end{array}\right)}{\left(\begin{array}{c}\text{AXIAL FLUX OF}\\ \text{AXIAL MOMENTUM}\end{array}\right)\left(\begin{array}{c}\text{TRANSVERSE}\\ \text{LENGTH SCALE}\end{array}\right)}$$

is large, the radial and axial pressure gradients cause a central toroidal recirculation zone to form (Gupta, et al. 1984). This phenomenon, which is widely exploited to stabilize combustion flames, is used in this invention as a mechanism to capture particles.

Another pervasive feature of swirling flows is their large resistance to contractions compared with their non-swirling counterparts. A vortex valve uses this fact by injecting a small secondary (or control) flow tangentially into a conduit and allowing the flow to contract radially (Lewellen 1971). The swirling action of the fluid is amplified because of a tendency to preserve angular momentum. Thus, a large back pressure develops within the valve and the flow rate decreases significantly. A hydrocyclone, which obviously has a different function than a flow valve, can be viewed as a vortex valve with the entire feed stream being used as the "control" flow component. In this invention a small control flow is used to supply energy to the vortex motion so the large feed flow can be introduced closer to the axis.

An additional effect employed in this invention, but not novel to hydrocyclone technology, is the observation that the separation of oil droplets from water can be enhanced by using a hydrophobic material for the vortex finder (Sheng, et al. 1974; Sliepcevich and Sheng 1969).

A BRIEF DESCRIPTION OF THE DRAWINGS

FIG. 1 illustrates the new separation concept. The method exploits two unrelated physical effects: (1) some novel secondary flows at high swirl numbers (S>0.5), and (2) the ability of high molecular weight polymers to reduce turbulent fluctuations.

FIG. 2 is a front view of the apparatus. The overflow contains the separated lighter phase and the underflow is relatively free of the dispersed phase. Two inlets are shown: the feed inlet 1, and the control flow inlet 7.

Figure 7:
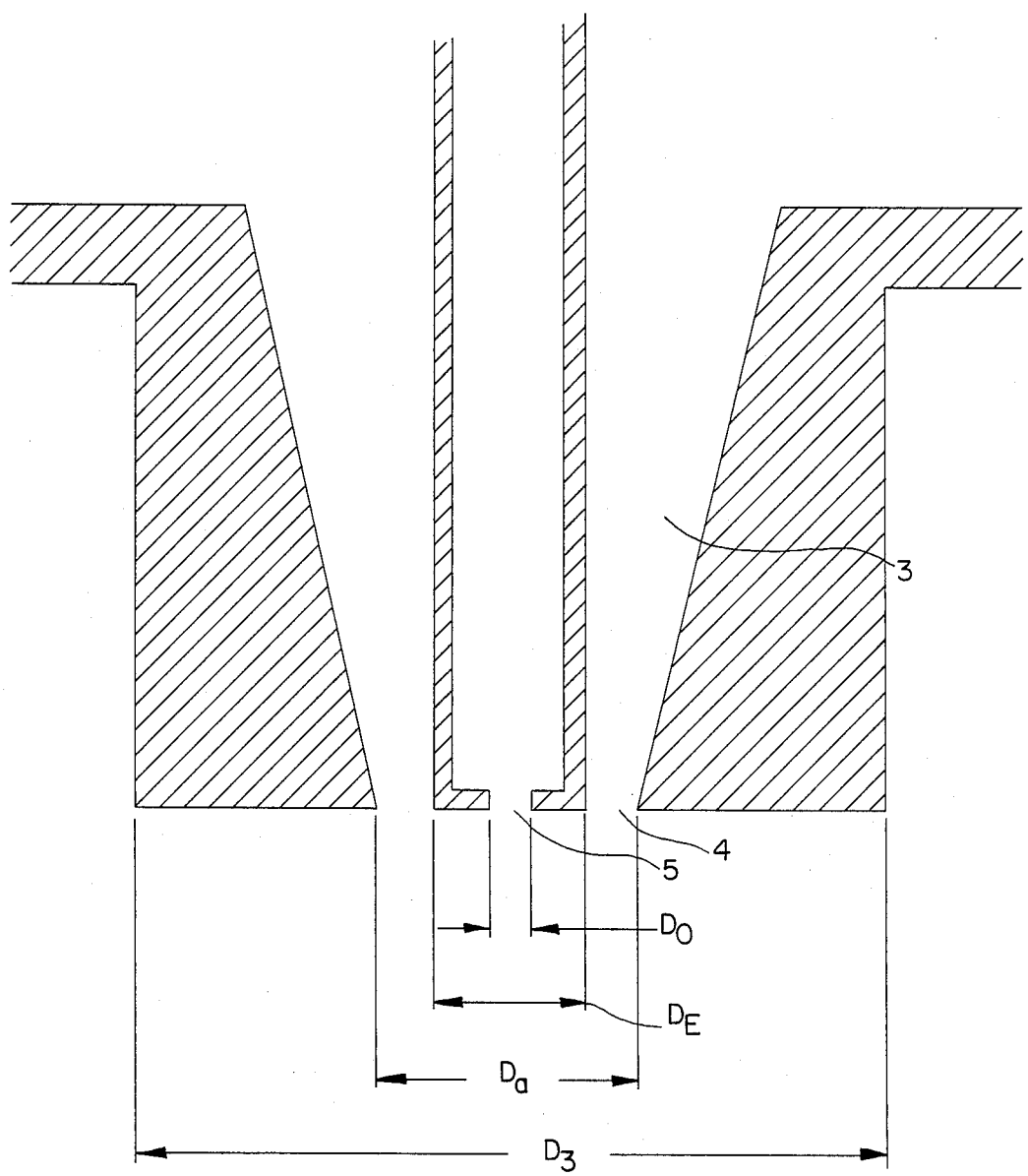

FIG. 7 gives a detailed view of the orifice region where the separation occurs. Although not shown in the drawing, a hydrophobic material for the orifice plate is preferred for oil-water separations.

Figure 8:
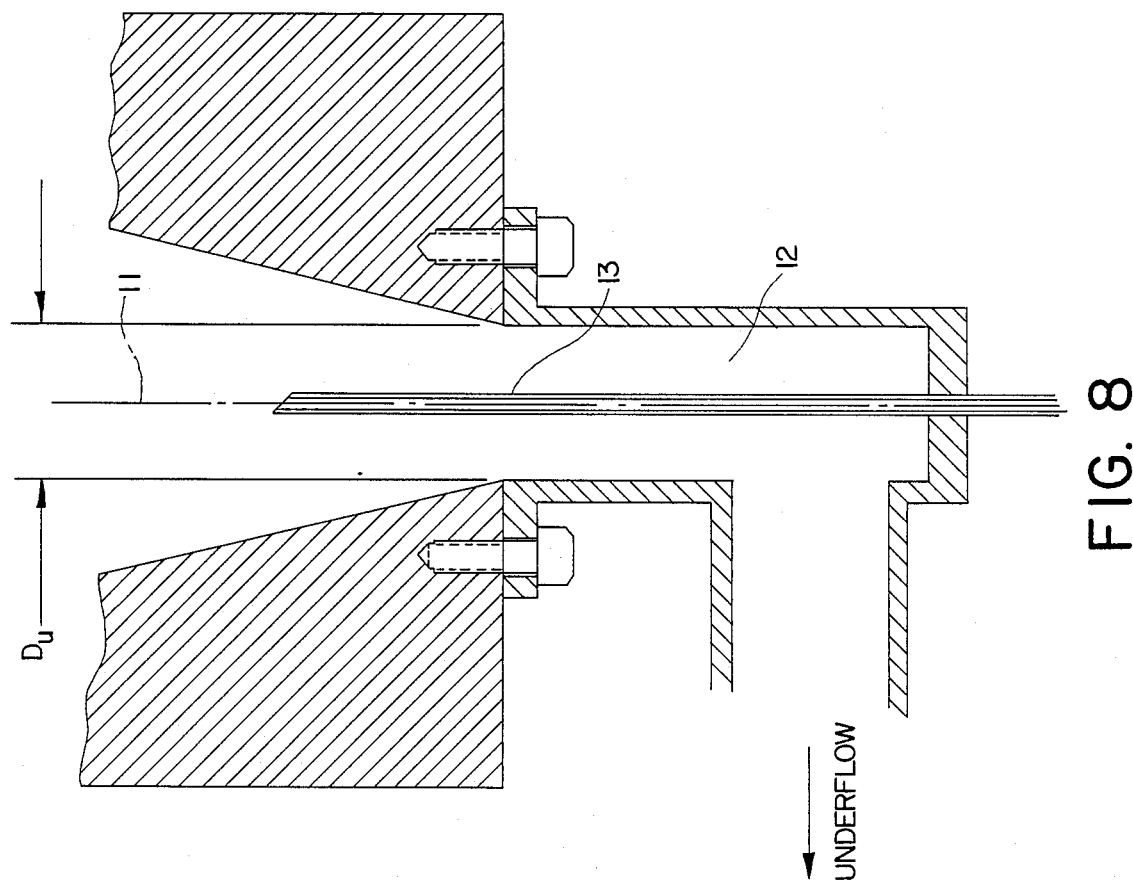

FIG. 8 illustrates how a polymer solution could be introduced into the core of the vortex.

DESCRIPTION OF THE INVENTION

Geometric and Operating Parameters

Figure 1:
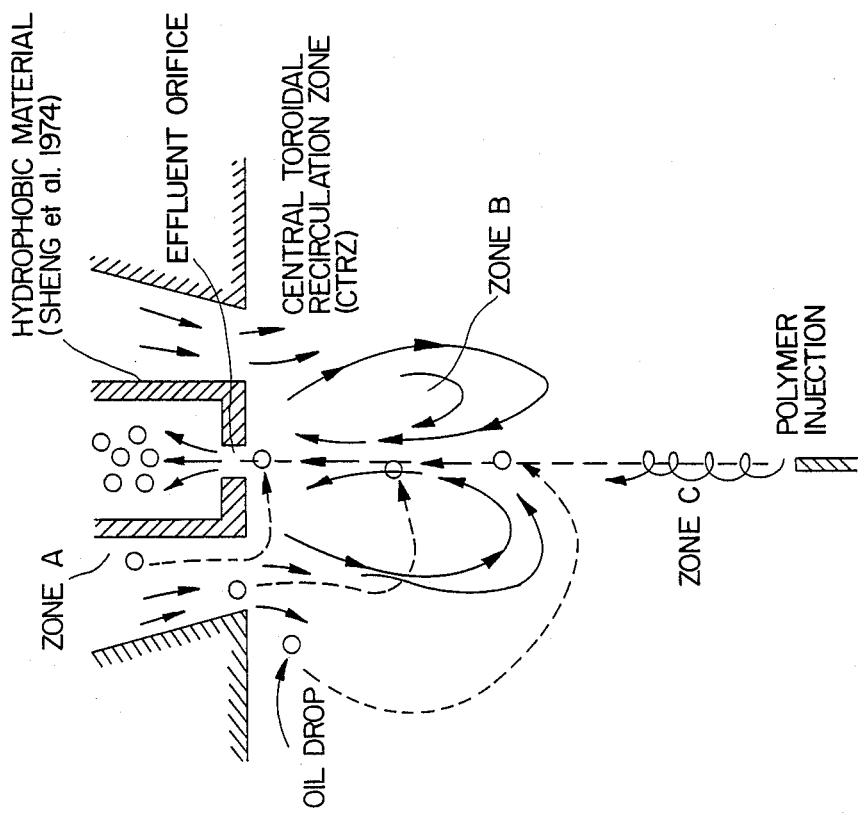
Figure 2:
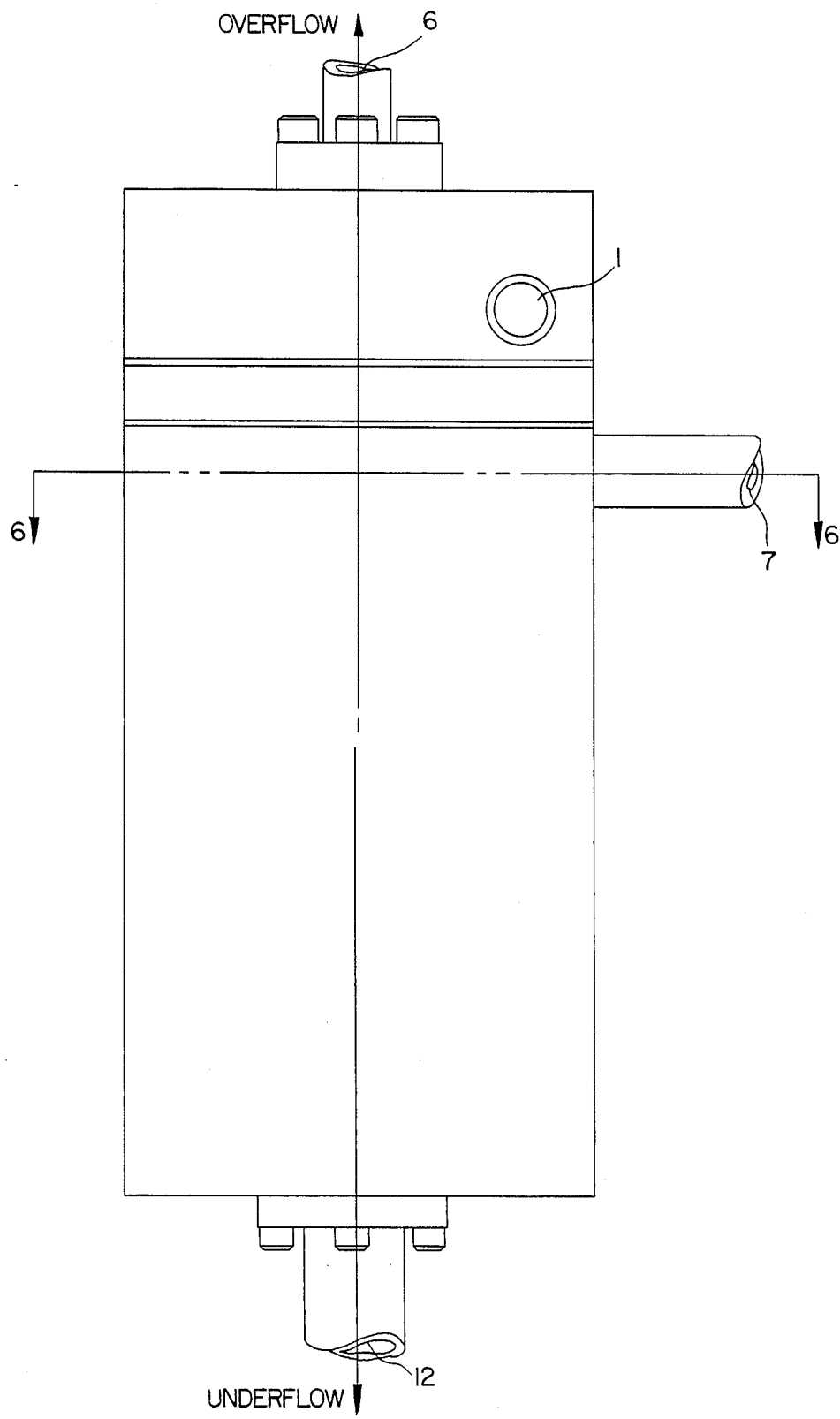
Figure 3:
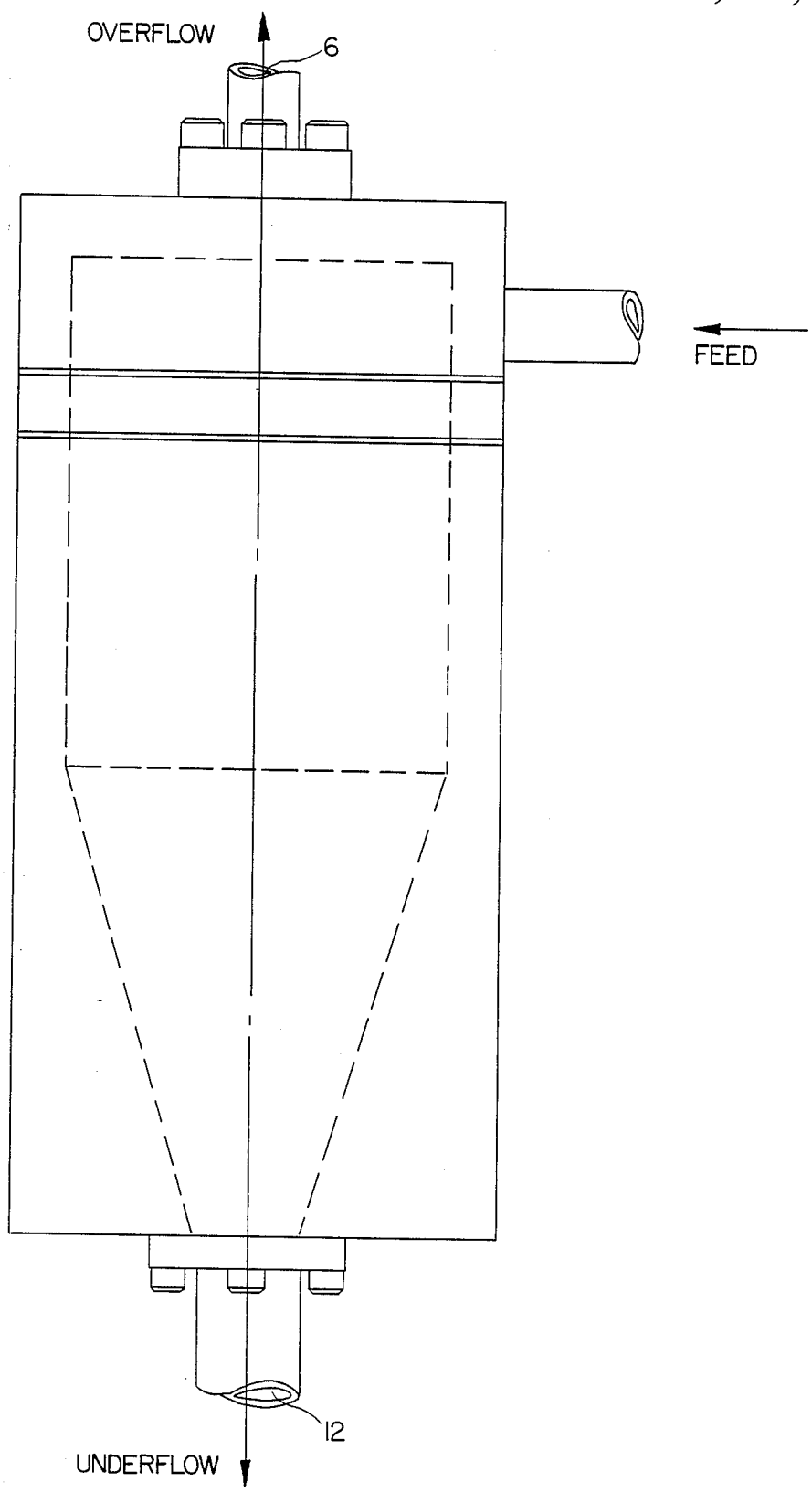
FIG. 3 is a side view of the device.
Figure 4:
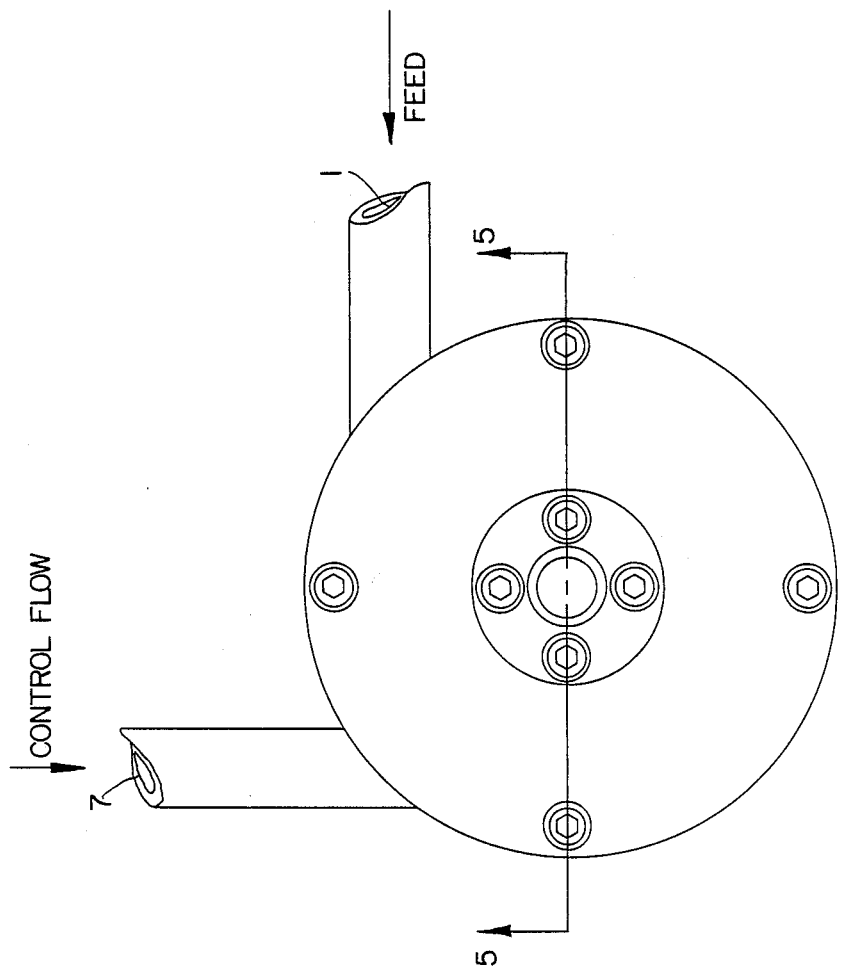
FIG. 4 shows a top view of the device.

This invention is an improved hydrocyclonic device designed to separate a less dense dispersed phase from a denser liquid phase, such as small amounts of oil in water (3,000 ppm). FIG. 1 illustrates the underlying physical principles of the invention and FIGS. 2-8 are drawings of the apparatus. The drawings are not to scale.

Figure 5:
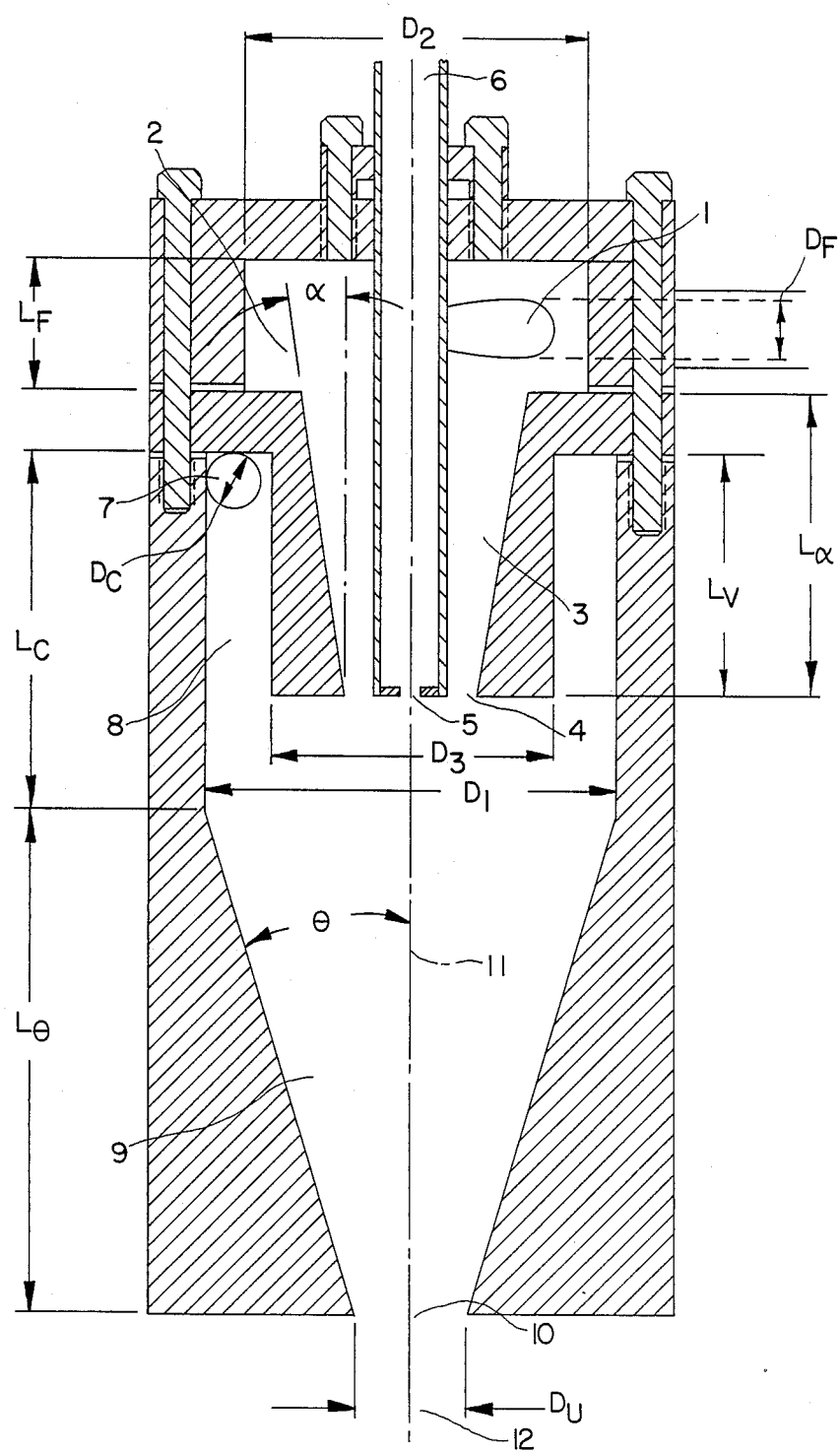
FIG. 5 is a sectional view along the line B—B' of FIG. 4. Note the 'piggyback' configuration of the design.
Figure 6:
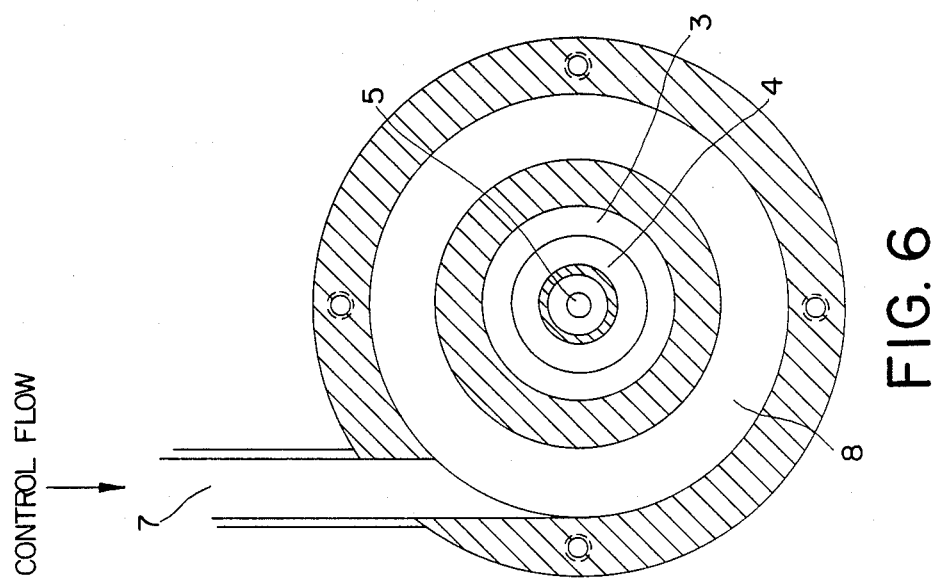
FIG. 6 is a sectional view along the line A—A' of FIG. 2 showing the tangential entry of the control flow.

The shape and performance of the separator are determined by the following geometric and operating parameters:

$D_1$ diameter of the primary (first) cyclone
$D_2$ diameter of the feed (second) cyclone
$D_3$ external diameter of the injection nozzle
$D_c$ diameter of the control flow entry tube 7 shown in FIG. 5 as a cylindrical inlet to the primary (first) cyclone
$D_F$ diameter of the feed entry tube 1
$D_u$ diameter of the underflow effluent tube 10
$D_a$ outside diameter of the annular nozzle 4
$D_E$ outside diameter of the overflow effluent tube 6 (see FIG. 7)
$D_o$ diameter of the overflow orifice 5
$L_F$ length of the feed (second) cyclone swirl chamber 2
$L_c$ length of the primary (first) cyclone swirl chamber 8
$L_v$ length of the injection nozzle into the primary (first) cyclone
$L_\alpha$ length of the conical section 3 of the feed (second) cyclone
$L_\theta$ length of the conical section 9 of the primary (first) cyclone
$\alpha$ half angle of the apex of the feed (second) cyclone
$\theta$ half angle of the apex of the primary (first) cyclone
$Q_F$ volumetric flow rate of the feed stream to the feed (second) cyclone through entry 1
$Q_c$ volumetric flow rate of the control flow to the primary (first) cyclone through entry 7
$Q_o$ volumetric flow rate of the overflow stream through the exit 6
$Q_u$ volumetric flow rate of the underflow stream through the exit 10
$P_F$ pressure of the feed stream
$P_c$ pressure of the control flow
$P_o$ pressure of the overflow stream
$P_u$ pressure of the underflow stream
$C_F$ concentration of the dispersed phase in the feed stream
$C_c$ concentration of the dispersed phase in the control flow
$C_o$ concentration of the dispersed phase in the overflow stream
$C_u$ concentration of the dispersed phase in the underflow stream Operating Principles The unique 'piggyback' configuration of this invention offers three distinct zones of separation (see FIG. 1). A liquid feed stream containing a less dense dispersed phase (either an immiscible liquid or a solid) enters the swirl chamber 2 through the tangential entry 1. The feed pressure $P_F$ is larger than $P_u$ and $P_o$. The fluid accelerates toward the annular opening 4 through the conical section 3 of the feed (second) cyclone. The swirling action of the fluid causes the less dense dispersed phase to migrate toward the external wall of the vortex finder tube 6 before the feed stream discharges into the primary (first) cyclone as a swirling annular jet through the opening 4. A short-circuit boundary layer running across the orifice plate from the annular region 4 toward the effluent orifice 5 captures the more concentrated stream. Thus one of the objectives of using the feed cyclone is to directly exploit the natural tendency to form an inwardly directed boundary layer on the orifice plate. In more conventional hydrocyclone designs, the end wall boundary layer phenomenon makes the operation less efficient because the concentration of the fluid entrained by the vortex finder is the same as the feed concentration. The design here uses the swirling action of the feed cyclone to increase the concentration of the dispersed phase on the external surface of the vortex finder tube before being entrained into the effluent orifice 5. Obviously, the length $L_\alpha$ of the conical section 3 of the feed (second) cyclone is a critical parameter for the optimum performance of Zone A.

For the special case of oil-water separation, the performance of Zone A can be improved by using a hydrophobic material for the orifice plate and the vortex finder tube. As previously mentioned, the idea of using different construction materials to enhance the separation effect has been used previously (see Sliepcevich and Sheng, 1969). However, this feature when employed with the 'piggyback' concept may yield additional benefits even for dilute dispersions. An orifice plate made of a hydrophobic material, such as nylon or polyethylene, should stabilize the short circuit flow of an oily fluid.

At high swirl numbers, a secondary flow (central toroidal recirculation zone) occurs in front of the orifice in the primary (first) cyclone. Gupta et al. [1984] have studied this phenomenon extensively for gaseous combustion processes. The hydrocyclonic apparatus of this invention exploits this effect directly by setting the design and operating conditions to develop a Zone B separation region (see FIG. 1). The central toroidal recirculation zone together with the centrifugal action on the less dense dispersed phase enhances the migration of small particles toward the axis of the primary cyclone. A flow on the axis streaming toward the effluent orifice from the apex region removes the particles from the primary cyclone.

The important parameter governing the occurence of Zone B is the swirl number defined previously. This dimensionless group must be larger than unity for swirling annular jets to induce a central toroidal recirculation zone (Gupta et al. 1984). In the present invention, this is achieved by the design of the injection nozzle (i.e., the feed cyclone) and by the use of a relatively high kinetic energy control flow ($Q_c << Q_F$, $P_c >> P_F$) introduced directly into the primary cyclone through the entry 7. The central flow enters a swirl chamber 8 and provides the needed energy to sustain the vortex motion in the primary cyclone. Although the present invention visualizes that the control flow is obtained by recycling a portion of the clean underflow fluid, the scope of the invention also includes the possibility that the relatively control flow could be obtained by diverting a portion of the feed containing the dispersed phase.

A third separation region (Zone C) occurs in the apparatus as a result of the swirling action in the lower part of the primary (first) cyclone. Here the dispersed phase migrates toward the axis 11 of the vortex where a reverse flow initiated near the underflow orifice 10 streams toward the effluent orifice 5 carrying the separated particles from the primary cyclone. The control flow introduced through the tangential entry 7 and the bulk of the feed flow introduced through the annular opening 4 moves toward the underflow exit 12 by following a path near the conical wall 9. The effectiveness of Zone C depends on the length $L_\alpha$ of the primary cyclone and on the contraction ratio $D_u/D_1$.

A novel aspect of the invention is the use of a high molecular weight polymer ($\geq 500,000$) such as polyethylene oxide or polyacrylamide to dampen turbulent fluctuations and to stabilize the reverve jet-like flow on the axis 11. FIG. 8 illustrates the injection of polymer through a tube 13 into the vortex core 11.

PERFORMANCE OF THE INVENTION

A hydrocyclonic apparatus was constructed based on FIGS. 2–7 for which $D_1=D_2=76$ mm. Nominal values of the geometric scales are: $D_3/D_1=\frac{2}{3}$, $D_c/D_1=3/16$, $D_F/D_2=3/16$, $D_u/D_1=\frac{1}{3}$, $D_E/D_1=1/6+$, $L_F/D_2=\frac{1}{3}$, $L_c/D_1=4/3$, $L_v/D_1=\frac{2}{3}$, $L_a/D_2=5/6$, $L_\theta/D_1=4/3$, $\alpha \approx 4.3°$, and $\theta \approx 14°$.

Although the above ratios are not necessarily the best combinations for the separation objective, they are convenient choices for a preliminary investigation. The performance of the 'piggyback' configuration is presently being studied for different nozzle designs with $D_a/D_1=\frac{1}{4}, \frac{1}{3}, \frac{1}{2}$ and $D_o/D_1=1/24, 1/12, 1/6.$ A preferred embodiment of the invention for oily water cleanup will have the following characteristics consistent with the goal that $c_u < 50$ ppm:
1. $D_o/D_1$ and $Q_o/Q_F$ should be small to concentrate the overflow stream;
2. $D_F/D_2$ and $L_F/D_2$ should be large to reduce the turbulence of the fluid in the swirl chamber;
3. $D_c/D_1$ should be small to produce a high kinetic energy tangential jet to drive the vortex;
4. $D_u/D_1$ should be large enough to receive the bulk of the flow $(Q_F+Q_c)$, but small enough to produce a jet-like reverse flow on the axis;
5. $L_a/D_2$ should be large enough to allow the dispersed phase to separate before entering the primary cyclone;
6. $L_\theta/D_1$ should be large enough to allow the dispersed phase to migrate into the core of the vortex; and
7. $D_a/D_1$, $D_c/D_1$, and $Q_c/Q_F$ should be selected to produce a central toroidal recirculation zone.

The separation performance of the invention has been tested using 700 μm polymer beads (styrene-divinylbenzene, density≃1.04 g/cm³) dispersed in salt water solutions. For the following three examples, $D_a/D_1=\frac{1}{2}$ and $D_o/D_1=1/6$. Also, no friction-reducing polymers were used.

EXAMPLE 1

A suspension of 700 μm polymer beads (700–1,000 ppm) was prepared in a 19 wt % salt solution (density≃1.14 g/cm³). With $Q_c=0$, $Q_F=41$ l/min, and $Q_o/Q_F=0.088$, the overall separation efficiency, defined by $E=(1-C_u/C_F)100,$ was 100%. No polymer beads were observed in the underflow. The same results were observed for $Q_F=34$ l/min and for $Q_F=16$ l/min.

EXAMPLE 2

A suspension of 700 μm polymer beads (3,000 ppm) was prepared in fresh water at 28° C. With $Q_c=0$, $Q_F=38$ l/min, and $Q_o/Q_F=0.22$, no polymer beads were observed in the overflow ($E=0\%$).

EXAMPLE 3

A suspension of 700 μm polymer beads (3,000 ppm) was dispersed in a salt solution having a density slightly above the styrene-divinylbenzene beads. The density of the salt solution was approximately 1.049 g/cm³. Under quiescent conditions the beads would just float in the salt solution; in fresh water, the beads would sink. The density difference between the dispersed phase and the continuous phase in this example is only 0.009 g/cm³. The Stokes' settling velocity is equivalent to a 210 μm particle having a density difference of 0.100 g/cm³. With $Q_c=0$, $Q_F=38$ l/min, and $Q_o/Q_F=0.04$, the separation efficiency was larger than 70%. In particular:

(1) The hydrocyclonic apparatus generally comprises:

(a) a first fluid cyclone having an upper end with a diameter $D_1$ (see FIG. 5) and a lower end with diameter $D_u$ less than $D_1$ along a longitudinal axis of the cyclone and comprising a first fluid inlet 7 oriented to supply liquid tangentially thereto at the upper end thereof, wherein the fluid rotates around the interior surface of the cyclone, wherein the cyclone has a frustoconical shape between the upper end and the lower end for maintaining the angular momentum of the fluid flow, a first fluid cylindrical outlet 6 communicating with the interior of the cyclone along the longitudinal axis at the upper end, a second fluid cylindrical outlet 12 communicating with the interior of the cyclone at the lower end; and (b) a second fluid cyclone mounted coaxially around the first fluid cylindrical outlet 6 and comprising a second fluid inlet 1 to supply fluid tangentially to the second fluid cyclone and to a third fluid annular outlet 4 into the first fluid cyclone, wherein in operation of the hydrocyclone particle free fluid is supplied to the first inlet 7 (control flow) and through the first cyclone and out the second outlet 12, wherein fluid containing dispersed particles having a mass density less than the fluid phase is supplied to the second fluid inlet 1 and wherein the particles in concentrated form are removed through the first fluid cylindrical outlet 6.

(2) The hydrocyclonic apparatus is preferred where the first fluid cylindrical outlet 6 contains an orifice 5 having a diameter $D_o$ less than the outside diameter of the first fluid outlet 6 which allows collection of the dispersed particles (see FIGS. 1 and 7).

(3) The apparatus is also preferred wherein injection means (see FIG. 8) is provided at the second fluid outlet 12 for providing a polymer solution along the axis of the first fluid cyclone directed towards the orifice 5 and the first fluid cylindrical outlet 6. The polymer should be a high molecular weight (>500,000), linear macromolecule such as, but not limited to, polyethylene oxide or polyacrylamide.

(4) The apparatus is also preferred wherein the second fluid cyclone has a frustoconical shape with the second fluid inlet at a larger upper portion with diameter $D_2$ and the third fluid annular outlet 4 with cross sectional area $\pi(D_a^2-D_E^2)/4$ at a smaller lower portion coaxial with the first fluid outlet 6.

(5) The hydrocyclonic apparatus is preferred wherein injection means is provided at the second fluid outlet 12 for providing a polymer solution-such as, but not limited to, polyethylene oxide and water or polyacrylamide and water-along the axis of the first fluid-cyclone directed towards the orifice 5 and the first fluid cylindrical outlet 6.

(6) The hydrocyclonic apparatus is preferred wherein the first fluid inlet 7 has a scroll shape. The cross sectional area of 7 may be either cylindrical or rectangular.

(7) The hydrocyclonic apparatus is preferred wherein the second fluid inlet 1 has a scroll shape. The cross-sectional area of 1 may be either cylindrical or rectangular.

(8) The hydrocyclonic apparatus is preferred wherein the first fluid cylindrical outlet (see FIG. 7) is composed of a hydrophobic plastic material such as, but not limited to, nylon or polyethylene, on the exposed surface adjacent to the orifice 5.

(9) The method for separating a less dense dispersed phase from a more dense fluid phase, such as oil in water, comprises (a) providing the apparatus of paragraph 1; and (b) separating the particles in concentrated form through the first cylindrical outlet 6 of the apparatus while introducing particle free fluid into the first fluid inlet 7 and fluid containing dispersed particles into the second fluid inlet 7 and removing clear fluid from the second fluid outlet 12.

We claim:

1. A hydrocyclonic apparatus which comprises:

(a) a first fluid cyclone having an upper end and a lower end smaller than the upper end along a longitudinal axis of the cyclone and comprising a first fluid inlet oriented to supply liquid tangentially thereto at the upper end thereof, wherein the fluid rotates around the interior surface of the cyclone, wherein the cyclone has a frustoconical shape between the upper end and the lower end for maintaining the angular momentum of the fluid flow, a first fluid outlet which projects inside the first cyclone and terminates in an orifice communicating with the interior of the cyclone along the longitudinal axis at the upper end, a second fluid outlet communicating with the interior of the cyclone at the lower end; and (b) a second fluid cyclone mounted around the longitudinal axis and around the first fluid outlet and comprising a second fluid inlet to supply fluid tangentially to the second fluid cyclone and around the first fluid outlet to a third annular fluid outlet into the first fluid cyclone wherein the third annular fluid outlet is adjacent to the orifice in the first fluid outlet, wherein in operation of the hydrocyclone clean fluid is supplied to the first inlet and through the first cyclone and out the second outlet, wherein fluid containing dispersed particles is supplied to the second fluid inlet and wherein the particles in concentrated form are removed through the first fluid outlet.

2. The apparatus of claim 1 wherein injection means is provided at the second fluid outlet for providing a polymer along the axis of the first fluid cyclone directed towards the first fluid outlet.

3. The hydrocyclonic apparatus of claim 1 wherein the second fluid cyclone has a frustoconical shape with the second fluid inlet at a larger upper portion and the third fluid outlet at a smaller lower portion adjacent to the first fluid outlet.

4. The hydrocyclonic apparatus of claim 1 wherein injection means is provided at the second outlet for providing a polymer along the axis of the first fluid cyclone directed towards the first fluid outlet; and wherein the second fluid cyclone has a frustoconical shape with the second fluid inlet at a larger upper portion and the third fluid outlet at a smaller lower portion adjacent to the first fluid outlet.

5. The hydrocyclonic apparatus of claim 1 wherein the first fluid inlet has a scroll shape.

6. The hydrocyclonic apparatus of claim 1 wherein the first fluid outlet is composed of a hydrophobic plastic material on the exposed surface adjacent to the orifice.

7. The hydrocyclonic apparatus of claim 6 wherein the plastic material is a tetrafluoroethylene polymer.

8. A method for separating dispersed particles in a fluid which comprises:

(a) providing an apparatus which comprises: a first fluid cyclone having an upper end and a lower end smaller than the upper end along a longitudinal axis of the cyclone and comprising a first fluid inlet oriented to supply liquid tangentially thereto at the upper end thereof, wherein the fluid rotates around the interior surface of the cyclone, wherein the cyclone has a frustoconical shape between the upper end and the lower end for maintaining the angular momentum of the fluid flow, a first fluid outlet which projects inside the first cyclone and terminates in an orifice communicating with the interior of the cyclone along the longitudinal axis at the upper end, a second fluid outlet communicating with the interior of the cyclone at the lower end; and a second fluid cyclone mounted around the longitudinal axis and around the first fluid outlet and comprising a second fluid inlet to supply fluid tangentially to the second fluid cyclone and around the first fluid outlet to a third annular outlet into the first cyclone wherein the third annular fluid outlet is adjacent to the orifice in the first fluid outlet, wherein in operation of the hydrocyclone clean fluid is supplied to the first inlet and through the first cyclone and out the second outlet, wherein fluid containing dispersed particles is supplied to the second fluid inlet and wherein the particles in concentrated form are removed through the first fluid outlet; and (b) separating the particles in concentrated form through the first outlet of the apparatus while introducing clean fluid into the first fluid inlet and fluid containing dispersed particles into the second fluid inlet and removing clean fluid from the second fluid outlet.

9. The method of claim 8 wherein injection means is provided at the second fluid outlet and wherein a polymer is provided along the axis of the first fluid cyclone directed towards the first fluid outlet.

10. The method of claim 8 wherein the second fluid cyclone has a frustoconical shape with the second fluid inlet at a larger upper portion and the third fluid outlet at a smaller lower portion adjacent to the first fluid outlet.

11. The method of claim 8 wherein injection means is provided at the second outlet for providing a polymer along the axis of the first fluid cyclone directed towards the first fluid outlet; and wherein the second fluid cyclone has a frustoconical shape with the second fluid inlet at a larger upper portion and the third smaller fluid outlet at a smaller lower portion adjacent to the first fluid outlet.

12. The method of claim 8 wherein the first fluid inlet has a scroll shape.

13. The method of claim 8 wherein the first fluid outlet is composed of a hydrophobic plastic material on the exposed surface adjacent to the orifice.

14. The method of claim 8 wherein the plastic material is a tetrafluoroethylene polymer.

15. A hydrocyclonic apparatus which comprises:
   (a) a first fluid cyclone having an upper end and a lower end smaller than the upper end along a longitudinal axis of the cyclone and comprising a first fluid inlet oriented to supply liquid tangentially thereto at the upper end thereof, wherein the fluid rotates around the interior surface of the cyclone, wherein the cyclone has a frustoconical shape between the upper end and the lower end for maintaining the angular momentum of the fluid flow, a first fluid outlet which projects inside the first cyclone and terminates in an orifice communicating with the interior of the cyclone along the longitudinal axis at the upper end, a second fluid outlet communicating with the interior of the cyclone at the lower end; and
   (b) a second fluid cyclone mounted around the longitudinal axis and around the first fluid outlet and comprising a second fluid inlet to supply fluid tangentially to the second fluid cyclone and around the first fluid outlet to a third annular fluid outlet into the first fluid cyclone wherein the third annular fluid outlet is adjacent to the orifice in the first fluid outlet, wherein in operation of the hydrocyclone clean fluid is supplied to the first inlet and through the first cyclone and out the second outlet, wherein fluid containing dispersed particles is supplied to the second fluid inlet and wherein the particles in concentrated form are removed through the first fluid outlet, wherein injection means is provided at the second outlet for providing a polymer along the axis of the first fluid cyclone directed towards the first fluid outlet, wherein the second fluid cyclone has a frustoconical shape with the second fluid inlet at a larger upper portion and the third fluid outlet at a smaller lower portion adjacent to the first fluid outlet, wherein the first fluid outlet is in the form of an orifice which allows separation of the particles and wherein the first fluid outlet is composed of a hydrophobic plastic material on the exposed surface adjacent to the orifice.

16. A method for separating dispersed particles in a fluid which comprises:
   (a) providing an apparatus which comprises: a first fluid cyclone having an upper end and a lower end smaller than the upper end along a longitudinal axis of the cyclone and comprising a first fluid inlet oriented to supply liquid tangentially thereto at the upper end thereof, wherein the fluid rotates around the interior surface of the cyclone, wherein the cyclone has a frustoconical shape between the upper end and the lower end for maintaining the angular momentum of the fluid flow, a first fluid outlet which projects inside the first cyclone and terminates in an orifice communicating with the interior of the cyclone along the longitudinal axis at the upper end, a second fluid outlet communicating with the interior of the cyclone at the lower end; and a second fluid cyclone mounted around the longitudinal axis and around the first fluid outlet and comprising a second fluid inlet to supply fluid tangentially to the second fluid cyclone and around the first fluid outlet to a third annular outlet into the first cyclone wherein the third annular fluid outlet is adjacent to the orifice in the first fluid outlet, wherein in operation of the hydrocyclone clean fluid is supplied to the first inlet and through the first cyclone and out the second outlet, wherein fluid containing dispersed particles is supplied to the second fluid inlet and wherein the particles in concentrated form are removed through the first fluid outlet; and
   (b) separating the particles in concentrated form through the first outlet of the apparatus while introducing clean fluid into the first fluid inlet and fluid containing dispersed particles into the second fluid inlet and removing clean fluid from the second fluid outlet, wherein injection means is provided at the second outlet for providing a polymer along the axis of the first fluid cyclone directed towards the first fluid outlet, wherein the second fluid cyclone has a frustoconical shape with the second fluid inlet at a larger upper portion and the third smaller fluid outlet at a smaller lower portion adjacent to the first fluid outlet, wherein the first fluid outlet is in the form of an orifice which allows separation of the particles, wherein the first fluid outlet is composed of a hydrophobic plastic material on the exposed surface adjacent to the orifice.

* * * * *

UNITED STATES PATENT AND TRADEMARK OFFICE
CERTIFICATE OF CORRECTION

PATENT NO.  : 4,855,066
DATED       : August 8, 1989
INVENTOR(S) : Charles A. Petty, Hsin-Chih Chen and Robert G. Dvorak It is certified that error appears in the above—identified patent and that said Letters Patent is hereby corrected as shown below:

Face page, after "Inventors" --Robert G. Dvorak-- should be added as the third inventor.

Column 4, line 52, after "relatively", --small-- should be inserted.

Column 4, line 68, "($\geqq$500,000)" should be --($\geq$500,000)--.

Column 6, line 10, "continuous" should be --continuum--.

Column 7, line 27 "inlet 7" should be --inlet 1--.

Signed and Sealed this

Second Day of October, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,855,066
DATED : August 8, 1989
INVENTOR(S) : Charles A. Petty and Hsin-Chih Chen It is certified that error appears in the above-identified patent and that said Letters Patent is hereby corrected as shown below:

Column 1, after the Title, insert the following paragraph:

--Government Rights

This invention was made with Government support under Contract No. DE-FG22-93MT93002 awarded by the Department of Energy. The Government has certain rights in this invention.--

Signed and Sealed this

Seventeenth Day of November, 1998

*Attest:*

BRUCE LEHMAN

*Attesting Officer*   *Commissioner of Patents and Trademarks*